United States Patent
Cho et al.

(10) Patent No.: US 9,467,931 B2
(45) Date of Patent: Oct. 11, 2016

(54) METHOD AND DEVICE FOR ENTERING NETWORK FOR CLIENT COOPERATION IN WIRELESS COMMUNICATION SYSTEM

(75) Inventors: Hee Jeong Cho, Anyang-si (KR); Eun Jong Lee, Anyang-si (KR); Young Soo Yuk, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 324 days.

(21) Appl. No.: 14/005,771

(22) PCT Filed: Mar. 30, 2012

(86) PCT No.: PCT/KR2012/002385
§ 371 (c)(1),
(2), (4) Date: Sep. 17, 2013

(87) PCT Pub. No.: WO2012/134223
PCT Pub. Date: Oct. 4, 2012

(65) Prior Publication Data
US 2014/0016590 A1 Jan. 16, 2014

Related U.S. Application Data

(60) Provisional application No. 61/469,103, filed on Mar. 30, 2011, provisional application No. 61/469,104, filed on Mar. 30, 2011, provisional application No. 61/490,071, filed on May 26, 2011.

(51) Int. Cl.
*H04W 48/16* (2009.01)
*H04W 88/04* (2009.01)
(Continued)

(52) U.S. Cl.
CPC ............ *H04W 48/16* (2013.01); *H04L 5/0035* (2013.01); *H04W 40/22* (2013.01); *H04W 88/04* (2013.01); *H04L 5/0053* (2013.01)

(58) Field of Classification Search
CPC ... H04W 48/16; H04W 88/04; H04W 40/22; H04L 5/0035; H04L 5/0053
See application file for complete search history.

(56) References Cited

U.S. PATENT DOCUMENTS

| | | | |
|---|---|---|---|
| 2006/0153132 A1* | 7/2006 | Saito | H04B 7/155 370/329 |
| 2007/0076649 A1 | 4/2007 | Lin et al. | |

(Continued)

FOREIGN PATENT DOCUMENTS

| | | |
|---|---|---|
| CN | 101902822 A | 12/2010 |
| KR | 10-2007-0090431 A | 9/2007 |
| KR | 10-2009-0056768 A | 6/2009 |

OTHER PUBLICATIONS

Masato Okuda, "MS Network Entry for transparent Relay Station", IEEE 802.16 Broadband Wireless Access Working Group, IEEE C802.16j-07/00IrI, Jan. 16, 2007.

(Continued)

*Primary Examiner* — Ajay Cattungal
(74) *Attorney, Agent, or Firm* — Dentons US LLP

(57) ABSTRACT

Provided are a method and a device for entering a network for client cooperation in a wireless communication system. A first device, through a frame of a first system, receives a ranging request message from a second device, and transmits the received ranging request message to a base station. As a response thereto, the first device receives a range response message, which is a response to the ranging request message, from a base station of a second system, and through a frame of the first system, transmits the range response message to the second device.

11 Claims, 19 Drawing Sheets

(51) Int. Cl.
*H04W 40/22* (2009.01)
*H04L 5/00* (2006.01)

(56) References Cited

U.S. PATENT DOCUMENTS

| | | | |
|---|---|---|---|
| 2007/0076684 A1* | 4/2007 | Lee | H04B 7/155 370/350 |
| 2007/0280172 A1* | 12/2007 | Tan | H04B 7/2606 370/335 |
| 2008/0058003 A1 | 3/2008 | Rydnell et al. | |
| 2008/0139206 A1* | 6/2008 | Touray | H04W 8/18 455/437 |
| 2009/0213766 A1* | 8/2009 | Chindapol | H04B 7/2621 370/278 |
| 2010/0265888 A1* | 10/2010 | Kim | G01S 5/0263 370/328 |
| 2012/0013468 A1* | 1/2012 | Olah | G01S 5/0289 340/572.1 |
| 2012/0077486 A1 | 3/2012 | Park et al. | |
| 2012/0142371 A1* | 6/2012 | Park | H04W 60/02 455/456.1 |
| 2012/0263106 A1* | 10/2012 | Lee | H04W 4/005 370/328 |
| 2013/0235754 A1 | 9/2013 | Lim et al. | |

OTHER PUBLICATIONS

Inuk Jung, "Updated text on Study Report proposed by Ad-hoc", IEEE 802.16 Broadband Wireless Access Working Group, IEEE C802.16ppc-11/0007r3, Mar. 16, 2011.

* cited by examiner

FIG. 5

| Frame control | Persistent /ID | Address 1 | Address 2 | Address 3 | Sequence control | Address 4 | Sequence control | QoS control | HT control | Frame body | FCS |

METHOD AND DEVICE FOR ENTERING NETWORK FOR CLIENT COOPERATION IN WIRELESS COMMUNICATION SYSTEM

This Application is a 35 U.S.C. §371 National Stage Entry of International Application No. PCT/KR2012/002385, filed Mar. 30, 2012 and claims the benefit of U.S. Provisional Application Nos. 61/469,103, filed Mar. 30, 2011, 61/469,104, filed Mar. 30, 2011, and 61/490,071, filed May 26, 2011, all of which are incorporated by reference in their entirety herein.

BACKGROUND OF THE INVENTION

1. Field of the Invention

The present invention relates to wireless communication and, more particularly, to a method and device for entering a network for client cooperation in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a client cooperation technique may be introduced in a wireless communication system. The client cooperation technique refers to a technique by which a specific device helps transmission of another device. That is, one device may directly communicate with a base station (BS) or may indirectly communication with the BS by the aid of another device. The client cooperation technique has an effect of lower power consumption, throughput enhancement, etc.

The client cooperation technique can be more effectively used in a multi-radio access technology (RAT) device. The multi-RAT device refers to a device that can operate in a plurality of communication systems. For example, the multi-RAT device can operate both in institute of electrical and electronics engineers (IEEE) 802.16m and IEEE 802.11. To provide an easiness access to the BS anytime anywhere and to maintain effective performance, the multi-RAT device can use a multi-RAT client cooperation technique (i.e., improved tethering) in a heterogeneous network.

It is necessary to newly define procedures for performing, by the multi-RAT device, the multi-RAT client cooperation technique autonomously without aid of the BS.

SUMMARY OF THE INVENTION

The present invention provides a method and device for entering a network for client cooperation in a wireless communication system. The present invention proposes a method for allowing a source device to perform network entry to a base station through a cooperative device according to multi-radio access technology (RAT) client cooperation.

In an aspect, a method for entering, by a first device, a network for client cooperation in a wireless communication system is provided. The method includes receiving a ranging request message from a second device through a frame of a first system, transmitting the received ranging request message to a base station of a second system, receiving a ranging response message as a response to the ranging request message from the base station of the second system, and transmitting the ranging response message to the second device through the frame of the first system.

The first system may be an institute of electrical and electronics engineers (IEEE) 802.11 system.

The ranging request message may be transmitted to the base station of the second system through a ranging procedure.

The transmitting of the received ranging request message to the base station of the second system may comprise transmitting a ranging code to the base station of the second system, receiving allocated uplink resources from the base station of the second system, and transmitting the ranging request message to the base station of the second system through the allocated uplink resource.

The method may further include transmitting an identifier of the first device to the base station of the second system.

The identifier of the first device may be transmitted through a header or an extended header, or is transmitted by being included in the ranging request message.

The ranging request message may be transmitted to the base station of the second system through a bandwidth request procedure.

The transmitting of the received ranging request message to the base station of the second system may comprise transmitting a bandwidth request including an identifier of the first device to the base station of the second system, receiving allocated uplink resources from the base station of the second system, and transmitting the ranging request message to the base station of the second system through the allocated uplink resource.

The method may further include receiving an identifier of the second device or a new identifier for client cooperation from the base station of the second system.

The identifier of the second device or the new identifier for client cooperation may be received through a header or an extended header, or is received by being included in the ranging response message.

The first device may operate as a cooperative device of client cooperation, and the second device may operate as a source device of client cooperation.

The method may further include determining whether the first device is operable as a cooperative device of client cooperation.

The method may further include transmitting information for client cooperation with the second device to the second device.

The method may further include transmitting an acknowledgement (ACK) for the ranging request message to the second device, when the first device is operable as a cooperative device of client cooperation.

In another aspect, a device in a wireless communication system is provided. The device includes a radio frequency (RF) unit configured to transmit or receive a radio signal, and a processor connected to the RF unit, and configured to receive a ranging request message from a second device through a frame of a first system, transmit the received ranging request message to a base station of a second system, receive a ranging response message as a response to the ranging request message from the base station of the second system, and transmit the ranging response message to the second device through the frame of the first system.

A BS and a multi-RAT device can efficiently communicate with each other through client cooperation technology.

BRIEF DESCRIPTION OF THE DRAWINGS

FIG. 5 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.11 are chiefly described as an example in order to clarify the description, but the technical spirit of the present invention is not limited to IEEE 802.16m and IEEE 802.11.

Figure 1:
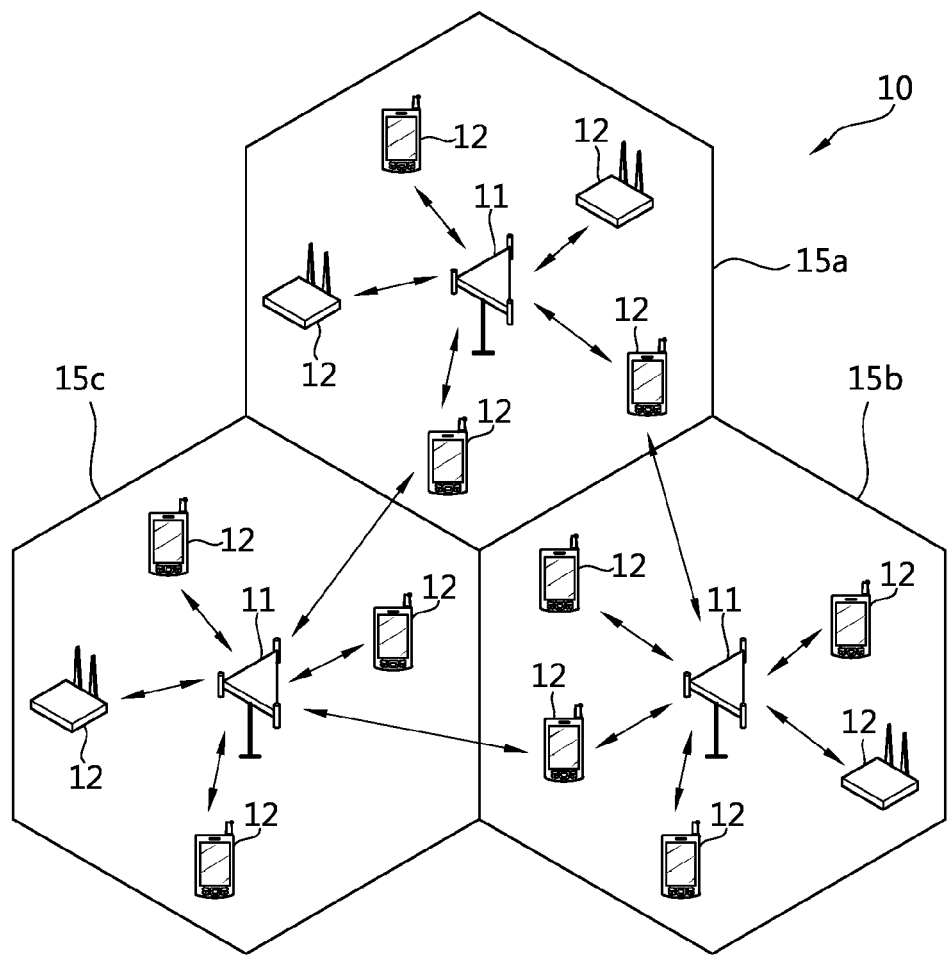
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
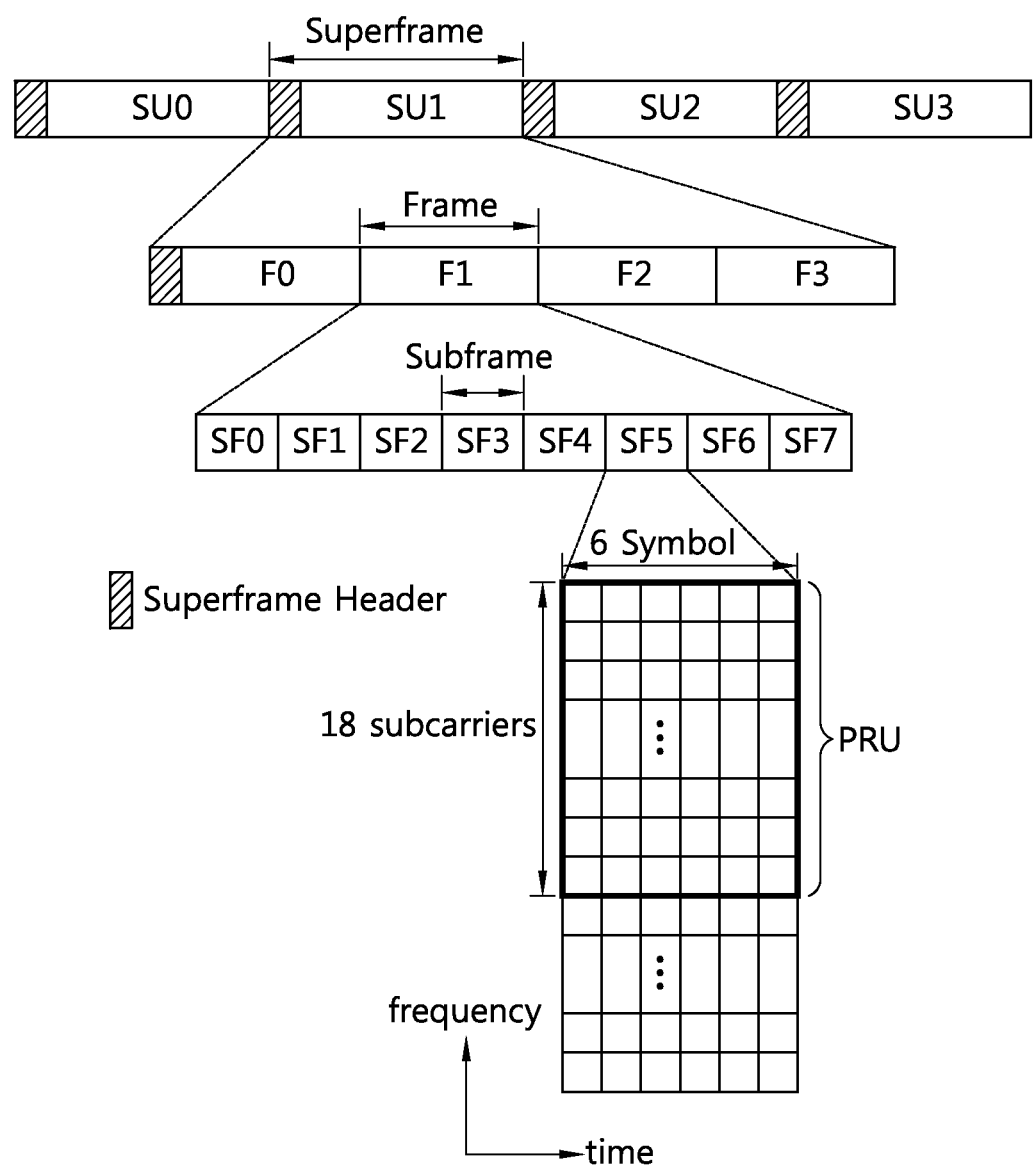
FIG. 2 shows an example of a frame structure of IEEE 802.16m.

FIG. 2 shows an example of a frame structure of IEEE 802.16m.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC- FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)×8000. A subcarrier spacing is defined as $\Delta f = F_s/NFFT$. A useful symbol time is defined as $T_{b=1}/\Delta f$. A CP time is defined as $T_g = G \cdot T_b$. An OFDMA symbol time is defined as $T_s = T_b + T_g$. A sampling time is defined as $T_b/N_{FFT}$.

Figure 3:
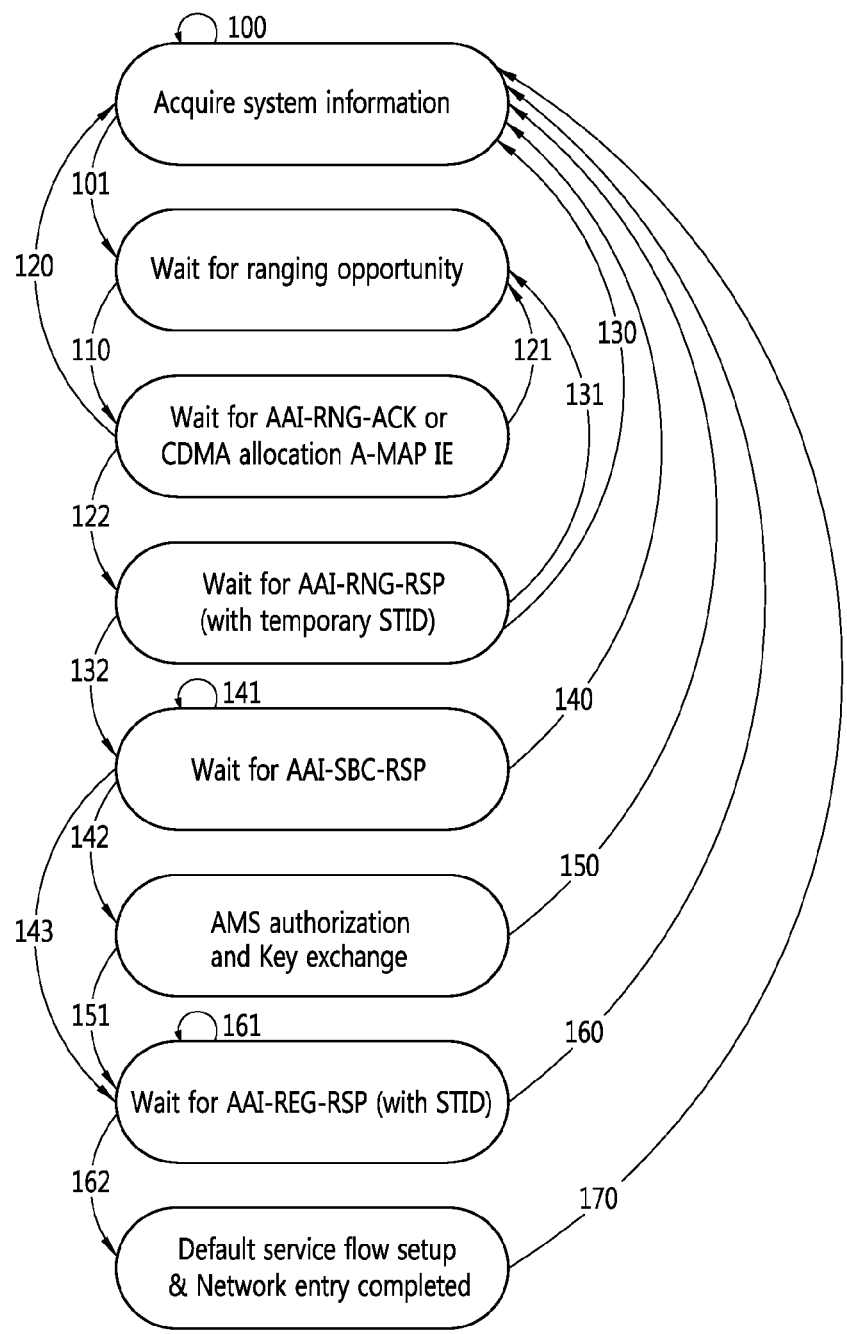
FIG. 3 shows an example of a state machine of a UE in an initial network entry process in IEEE 802.16m.

FIG. 3 shows an example of a state machine of a UE in an initial network entry process in IEEE 802.16m.

First, the UE acquires system information. If set DL synchronization, received DL and UL parameters, and a network are not selected (100), system information is acquired again. If set DL synchronization, received DL and UL parameters, and a network are selected (101), the UE waits for a ranging opportunity. When a ranging opportunity is obtained (110), the UE transmits an initial ranging code.

The UE waits for an AAI-RNG-ACK message or a CDMA allocation A-MAP information element (IE). If a timer T3 or T31 has expired or an AAI-RNG-ACK message in a state "not detected" is received and a retry opportunity has expired or an AAI-RNG-ACK message in a state "abort" is received (120), the UE acquires system information again. Alternatively, if an AAI-RNG-ACK message in a state "continue" or "not detected" is received or a timer T3 or T31 has expired and a retry opportunity remains (121), the UE waits for a ranging opportunity. When a CDMA allocation A-MAP IE is received (122), the UE transmits an AAI-RNG-REQ message.

After transmitting the AAI-RNG-REQ message, the UE waits for an AAI-RNG-RSP message with a temporary station identifier (STID). If the timer T3 has expired and the retry opportunity has been exhausted or an AAI-RNG-RSP message in a state "abort" is received (130), the UE acquires system information again. If the timer T3 has expired and the retry opportunity still remains (131), the UE waits for a ranging opportunity. When an AAI-RNG-RSP message with an STID of a state "success" is received (132), the UE transmits an AAI-SBC-REQ message.

After transmitting the AAI-SBC-REQ message, the UE waits for an AAI-SBC-RSP message. If a timer T18 has expired and the retry opportunity has been exhausted or an AAI-RNG-RSP message in a state "abort" is received (140), the UE acquires system information again. If the timer T18 has expired and the retry opportunity remains (141), the UE transmits an AAI-SBC-REQ message. If an AAI-SBC-RSP message is received and authorization is supported (142), UE authorization and a key exchange are performed. Here, if a timer T17 has expired and the retry opportunity has been exhausted or the AAI-RNG-RSP message in a state "abort" is received (150), the UE acquires system information again. If the UE is authorized (151), the UE transmits an AAI-REG-REQ message. If an AAI-SBC-RSP message is received and authorization is not supported (143), the UE transmits an AAI-REG-REQ message.

The UE that has transmitted the AAI-REG-REQ message waits for an AAI-REG-RSP message with an STID. Here, if a timer T6 has expired and the retry opportunity has been exhausted or an AAI-RNG-RSP message or an AAI-RES-CMD message in a state "abort" is received (160), the UE acquires system information again. If the timer T6 has expired and the retry opportunity remains (161), the UE transmits an AAI-SBC-REQ message. When an AAI-REG-RSP message is received (162), the UE processes the AAI-REG-RSP message.

A basic service flow is configured and network entry is completed through the above process. Here, when the AAI-RNG-RSP message, the AAI-DREG-RSP message, or the AAI-RES-CMD message in a state "abort" is received (170), the UE acquires system information again.

Figure 4:
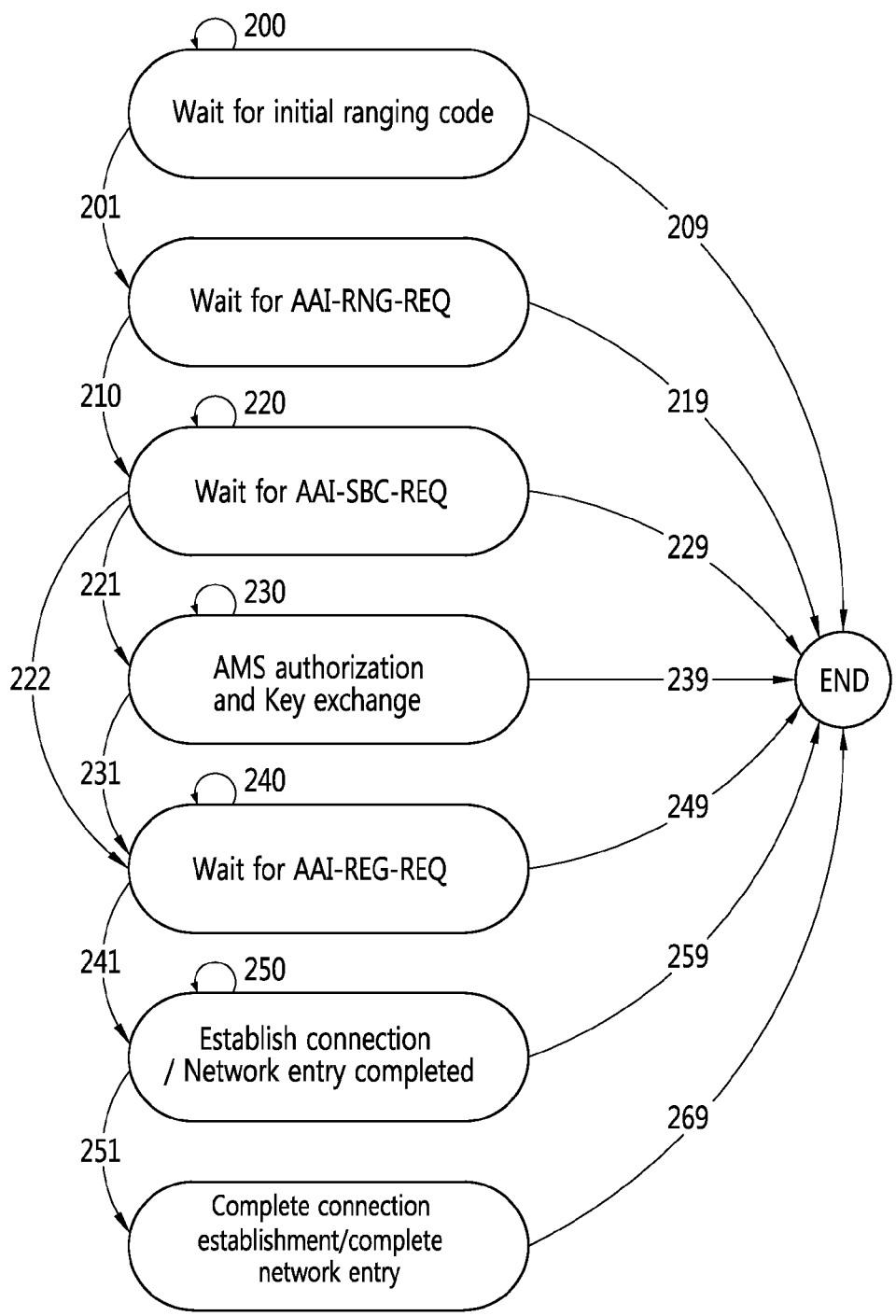
FIG. 4 shows an example of a state machine of a BS in an initial network entry process in IEEE 802.16m.

FIG. 4 shows an example of a state machine of a BS in an initial network entry process in IEEE 802.16m.

The BS waits for an initial ranging code. The BS receives the initial ranging code and transmits an AAI-RNG-ACK message in a state "continue" (200). Alternatively, the BS receives the initial ranging code and transmits an AAI-RNG-ACK message in a state "success" and a CDMA allocation A-MAP IE (201). Alternatively, the BS receives the initial ranging code and transmits an AAI-RNG-ACK message in a state "abort" (209). Here, an initial network entry process is terminated.

After transmitting the AAI-RNG-ACK message in a state "success" and the CDMA allocation A-MAP IE, the BS waits for an AAI-RNG-REQ message. The BS receives an AAI-RNG-REQ message and transmits an AAI-RNG-RSP message in a state "success" with a temporary STID (210). Alternatively, if a ranging response processing time has expired (219), the initial network entry process is terminated.

After transmitting the AAI-RNG-RSP message in a state "success" with a temporary STID, the BS waits for an AAI-SBC-REQ message. In this process, the BS may receive the AAI-RNG-REQ message again and transmit the AAI-RNG-RSP message again (220). If the AAI-SBC-REQ message is received and UE authorization is supported (221), the BS performs UE authorization and a key exchange. In this process, the BS may receive the AAI-SBC-REQ message again and transmit the AAI-SBC-RSP message again (230). If the UE is authorized (231), the BS waits for an AAI-REG-REQ message. Alternatively, the BS may terminate the initial network entry process by transmitting an AAI-RNG-RSP message in a state "abort" (229 and 239). If the AAI-SBC-REQ message is received and UE authorization is not supported (222), the BS waits for an AAI-REG-REQ message.

If UE authorization is not supported while waiting for the AAI-REG-REQ message, the BS may receive the AAI-SBC-REQ message again and transmit the AAI-SBC-RSP message again (240). When the AAI-REG-REG message is received, the BS transmits an AAI-REG-RSP message with an STID (241). Alternatively, the BS may terminate the initial network entry process by transmitting an AAI-RNG-RSP message in a state "abort" or an AAI-RES-CMD message (249).

After transmitting the AAI-REG-RSP message with an STID, the BS waits for acknowledgement (ACK) for the AAI-REG-RSP message. In this process, the BS may receive the AAI-REG-REQ message again and transmit the AAI-REG-RSP message with an STID again (250). When implicit or explicit ACK for the AAI-REG-RSP message is received (251), a connection is set up and the initial network entry is completed. Alternatively, the BS may terminate the initial network entry process by transmitting an AAI-RNG-RSP message, an AAI-RES-CMD message, or an AAI-DREG-RSP message in a state "abort" (259, 269).

FIG. 5 shows an example of a frame structure of IEEE 802.11.

A frame of IEEE 802.11 includes a set of fields in a fixed order. Referring to FIG. 5, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A deauthentication frame is used to finish an authentication relation. An association request frame is transmitted so that the mobile station participates in the network when the mobile station recognizes the compatible network and is authenticated. An association response frame is a response for the association request frame. A deassociation frame is used to finish an association relation.

Three states may exist according to an authentication and association procedure in IEEE 802.11. Table 2 below shows the three states of IEEE 802.11.

TABLE 2

|  | Authentication | Association |
|---|---|---|
| State 1 | X | X |
| State 2 | ○ | X |
| State 3 | ○ | ○ |

To transmit a data frame, a device must perform the authentication and association procedure with respect to a network. In Table 2, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 2, a procedure of transitioning from the state 2 to the state 3 can be called the association procedure. The association procedure can be complete when two devices exchange the association request frame and the association response frame upon completion of the authentication procedure. An association ID can be allocated by the association procedure.

A client cooperation technique may be introduced in a wireless communication system. One device may directly communicate with a base station (BS) or may indirectly communication with the BS by the aid of another device. Hereinafter, a source device refers to a device which communicates with the BS through a connection with another device. A cooperative device refers to a relay entity which helps the source device to communicate with the BS. The client cooperation technique has an effect of lower power consumption. In terms of a device, a path-loss can be decreased by the client cooperation technique, thereby being able to decrease transmit power. In terms of a network, total network power consumption can be decreased. In addition, the client cooperation technique has an effect of throughput enhancement. In terms of a device, a source device can use a good-quality link between a cooperative device and a BS and between BS s. In addition, an antenna extension gain can be obtained. In terms of the network, network capacity can be increased by using client clustering based on frequency reuse without an additional infrastructure.

Figure 6:
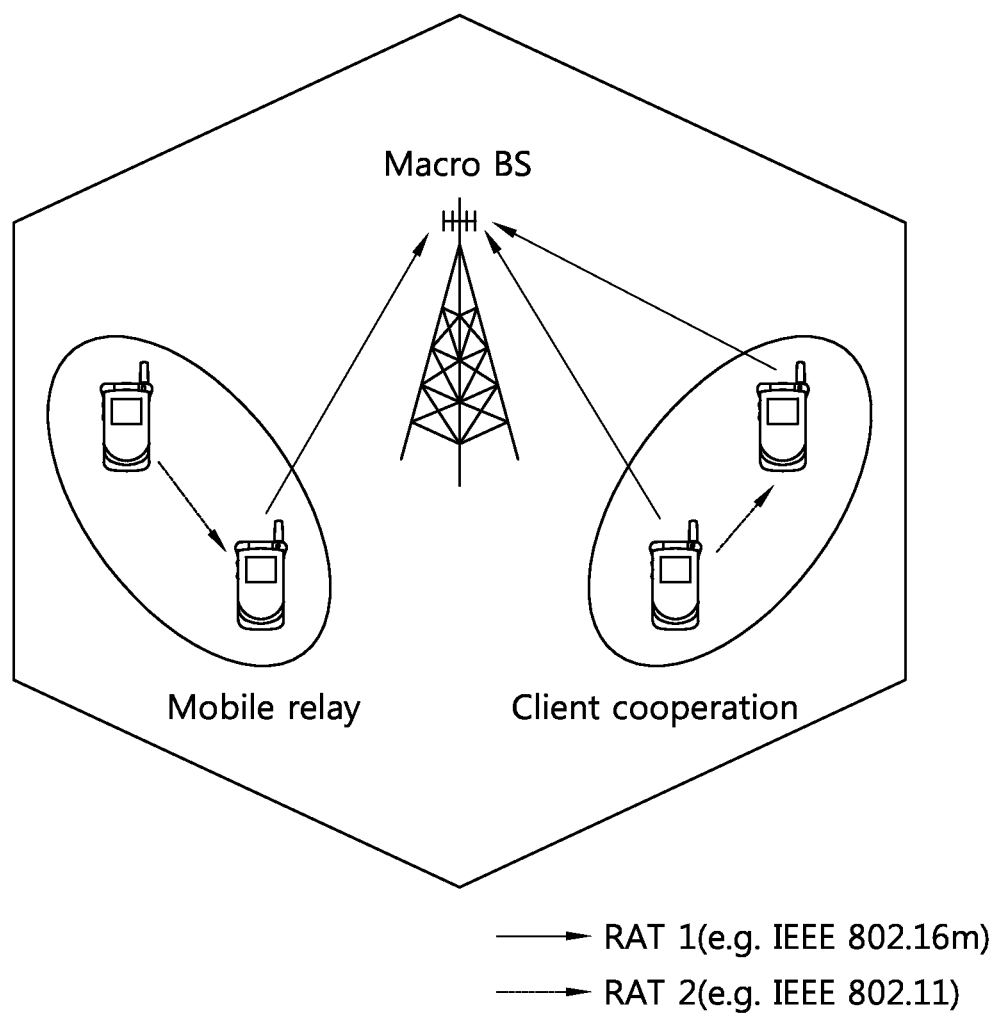
FIG. 6 shows an example of implementing a client cooperation technique.

FIG. 6 shows an example of implementing a client cooperation technique.

Referring to FIG. 6, in the client cooperation technique, a source device can directly communicate with a macro BS, or can communicate with the macro BS via a cooperative device. The cooperative device may directly communicate with the macro BS, or can help communication of the source device. This is different from a mobile relay in a sense that the source device can directly communicate with the macro BS. In this case, each device and the macro BS can communicate by using a first radio access technology (RAT), and the source device and the cooperative device can communicate by using a second RAT. The first RAT may be a radio technology such as IEEE 802.16 (WiMAX), IEEE 802.16m or IEEE 802.20, etc. Alternatively, the first RAT may be a radio technology such as E-UTRA, 3GPP LTE or 3GPP LTE-A, etc. The second RAT may be IEEE 802.11.

Figure 7:
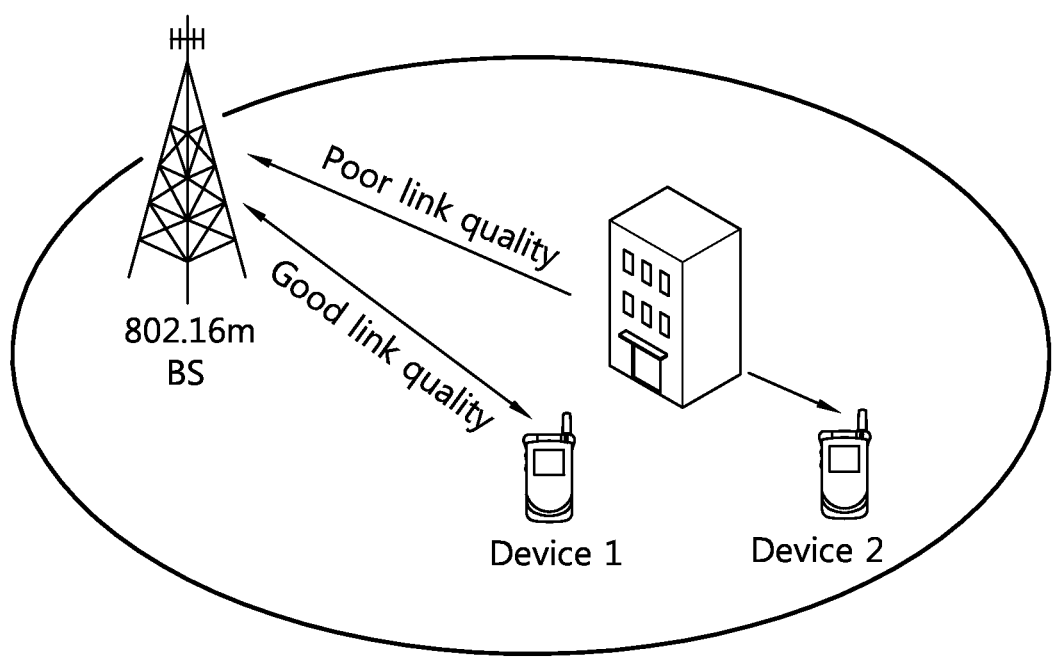
FIG. 7 shows another example of implementing a client cooperation technique.

FIG. 7 shows another example of implementing a client cooperation technique.

The client cooperation technique can be more effectively used in a multi-RAT device. The multi-RAT device refers to a device that can operate in a plurality of communication systems. For example, the multi-RAT device can operate both in IEEE 802.16m and IEEE 802.11. When the multi-RAT device uses the client cooperation technique, the multi-RAT device can communicate with an IEEE 802.16m BS by using a plurality of RATs. For example, as shown in FIG. 7, if channel quality is poor between a second device and a BS or if the second device located in a shadow area cannot receive a signal from the BS, the first device can be used as a cooperative device to communicate with the BS. In this case, each device and the BS can communicate by using the first RAT, and the source device and the cooperative device can communicate by using the second RAT. The first RAT may be a radio technique such as IEEE 802.16, IEEE 802.16m, IEEE 802.20, E-UTRA, 3GPP LTE or 3GPP LTE-A, etc. The second RAT may be IEEE 802.11.

Figure 8:
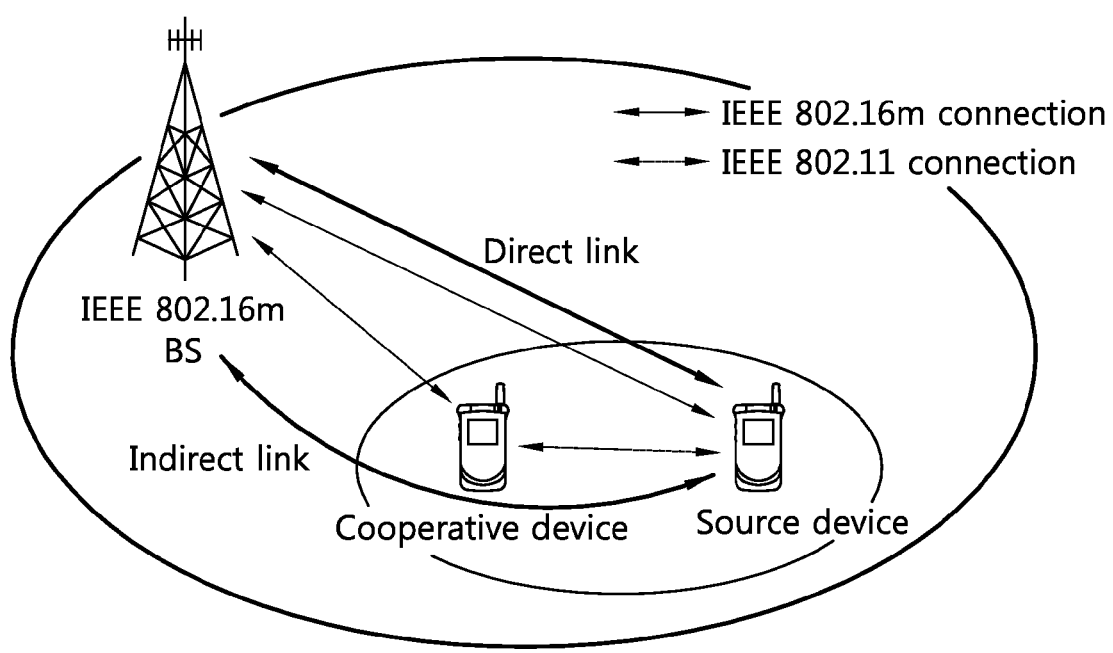
FIG. 8 shows another example of implementing a client cooperation technique.

FIG. 8 shows another example of implementing a client cooperation technique.

A source device and a macro BS (e.g., IEEE 802.16m BS) can be connected through a direct link, and can be connected through an indirect link by using a cooperative device. In this case, each device and the BS can be connected by using IEEE 802.16m, and the source device and the cooperative device can be connected by using IEEE 802.11.

Hereinafter, a method for a source device to perform network entry to a base station (BS) through a cooperative device will be described. A source device may perform network entry to a BS by transmitting various types of messages for network entry to the BS through a cooperative device. Hereinafter, it is assumed that the source device and the cooperative device are connected through IEEE 802.11 and the cooperative device and the BS are connected through IEEE 802.16m, as shown in FIGS. 7 and 8. However, the embodiment of the present inventions concept is not limited thereto and may be applicable to various radio access technologies (RATs). Based on the proposed method, the source device may be connected to the IEEE 802.16m BS through IEEE 802.11 connection with the cooperative device.

The method for the source device to perform network entry to the BS through the cooperative device may be divided into two methods.

1) First, the source device may attempt network entry to the IEEE 802.16m BS, without obtaining information for performing multi-RAT client cooperation (hereinafter, referred to as 'client cooperation',) from a counterpart device. Namely, a method in which the source device performs network entry to the IEEE 802.16m BS without knowing whether the counterpart device is operable as a cooperative device after the source device completes authentication and association procedure with the counterpart device may be proposed. In this case, since it cannot be known yet whether the counterpart device is operable as a cooperative device in client cooperation, the counterpart device may not be called a cooperative device. The counterpart device may not be called a cooperative device until when it is confirmed that the counterpart device is operable as a cooperative device.

Figure 9:
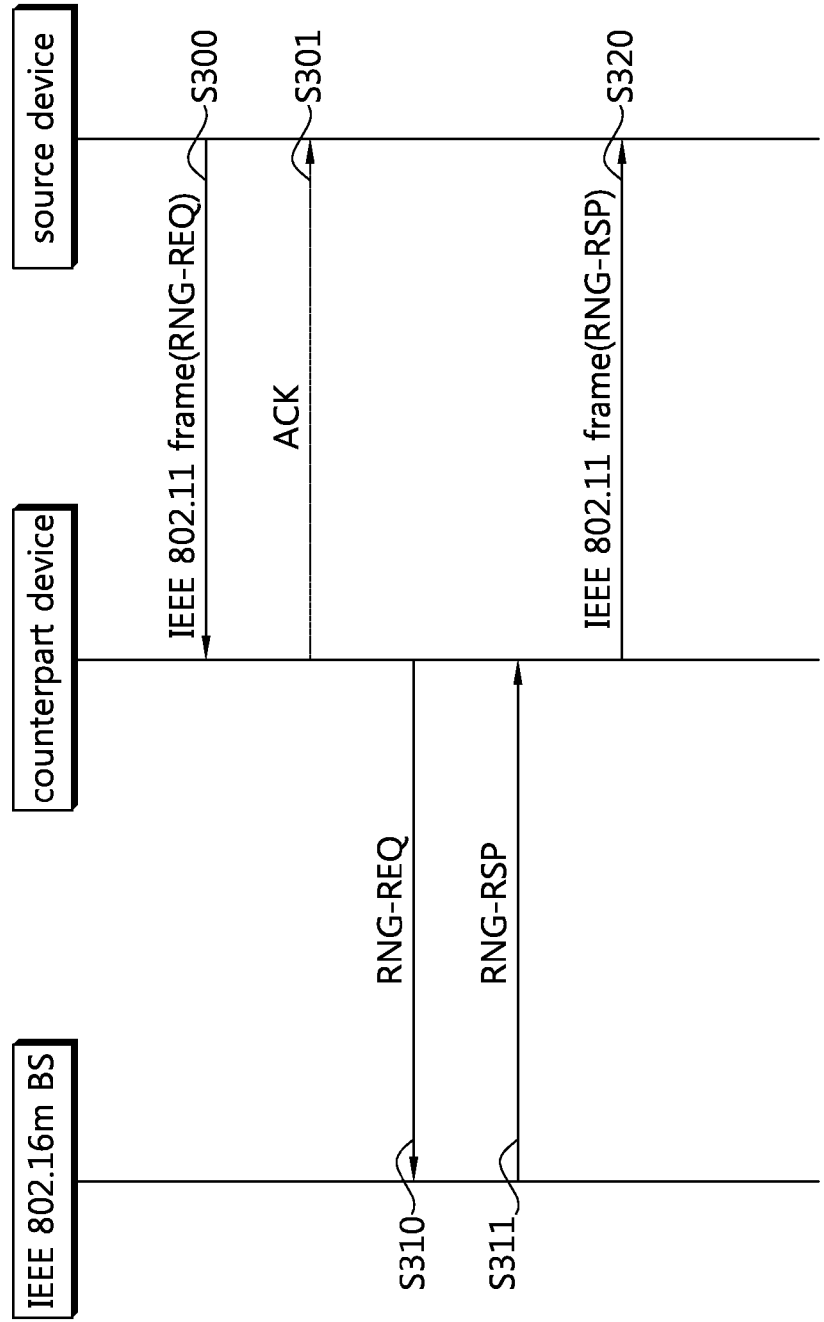
FIG. 9 shows an embodiment of the proposed network entry method.

FIG. 9 shows an embodiment of the proposed network entry method.

In step S300, the source device transmits a ranging request (RNG-REQ) message for network entry to the counterpart device in the IEEE 802.16m system. Here, the RNG-REQ message may be encapsulated in a frame body field of an IEEE 802.11 frame and transmitted.

In step S301, the counterpart device may transmit an acknowledgement (ACK) message for the RNG-REQ message to the source device. Transmission of the ACK message may be optional. When the counterpart device is operable as a cooperative device of client cooperation, the counterpart device may transmit the ACK message to the source device. Namely, the counterpart device may accept that it will operate as a cooperative device of client cooperation, through the ACK message. Accordingly, the counterpart device may become a cooperative device of client cooperation, and the source device may be a source device of client cooperation. Also, when it is assumed that an ACK message should be necessarily transmitted with respect to the RNG-REQ message, if the source device fails to receive an ACK message during a specific period of time after it transmits the RNG-REQ message, the source device may determine that a client cooperation request has been rejected, and may seek a different counterpart device.

In step S310, the counterpart transfers the RNG-REQ message to the BS by using a general ranging procedure or a general bandwidth request procedure. In step S311, the BS transmits a ranging response (RNG-RSP) message as a response to the RNG-REQ message to the counterpart device. Here, the BS may include a new identifier used for client cooperation or an identifier allocated to the source device in a header or an extended header, and transmit the same. Based on the corresponding identifier, the counterpart device may recognize that the RNG-RSP message is to be transmitted to the source device, and may transmit the RNG-RSP message as is, without decoding it, to the source device.

In step S320, the counterpart device transmits the RNG-RSP message to the source device. Here, the RNG-RSP message may be encapsulated in a frame body field of an IEEE 802.11 frame and transmitted. Upon receiving the RNG-RSP message as a response to the RNG-REQ message the source device has transmitted, the source device may recognize that the counterpart device has accepted to operate as a cooperative device of client cooperation. Accordingly, the counterpart device may become a cooperative device of client cooperation, and the source device may be a source device of client cooperation. Also, after the source device transmits the RNG-REQ message, if it fails to receive the RNG-RSP message during a specific period of time, the source device may determine that the client cooperation request was rejected, and may seek a different counterpart device.

In a manner similar to that described above, the source device may negotiate basic capability with the IEEE 802.16m BS. Namely, the source device encapsulates a basic capability request (SBC-REQ) message in a frame body field of an IEEE 802.11 frame and transmits the same to a counterpart device, and the counterpart device transmits the SBC-REQ message to the BS on the basis of a general bandwidth request procedure. As a response to DL resource allocation information using DL assignment A-MAP, or the like, and the SBC-REQ message, the BS transmits a basic capability response (SBC-RSP) message to the counterpart device. The counterpart device encapsulates the received SBC-RSP message in a frame body field of an IEEE 802.11 frame and transmits the same to the source device.

The other remaining network entry procedures, than the ranging and the basic capability negotiation, may be performed in a similar manner, except for exchanged messages. For example, a registration procedure may be performed in a manner similar to that of the basic capability negotiation procedure as described above. However, messages exchanged between and among the source device, the cooperative device, and the BS are a registration request (REG-REQ) message and a registration response (REG-RSP) message. Here, the BS may include a new identifier used for client cooperation or an identifier assigned to the source device in a header or an extended header and transmit the same. A privacy key management procedure may also be performed in a manner similar to that of the basic capability negotiation procedure. However, messages exchanged between or among the source device, the cooperative device, and the BS are privacy key management-related messages. A dynamic service flow procedure may be performed in a manner similar to that of the basic capability negotiation procedure. However, messages exchanged between or among the source device, the cooperative device, and the BS are dynamic service flow-related messages.

2) After obtaining information for performing multi-RAT client cooperation from the cooperative device, the source device may attempt network entry to the IEEE 802.16m BS. Namely, a method in which the source device performs network entry to the IEEE 802.16m BS after completing the authentication and association procedure with the cooperative device may be proposed. The method for the source device to obtain the information for performing multi-RAT client cooperation from the cooperative device will be described below.

Figure 10:
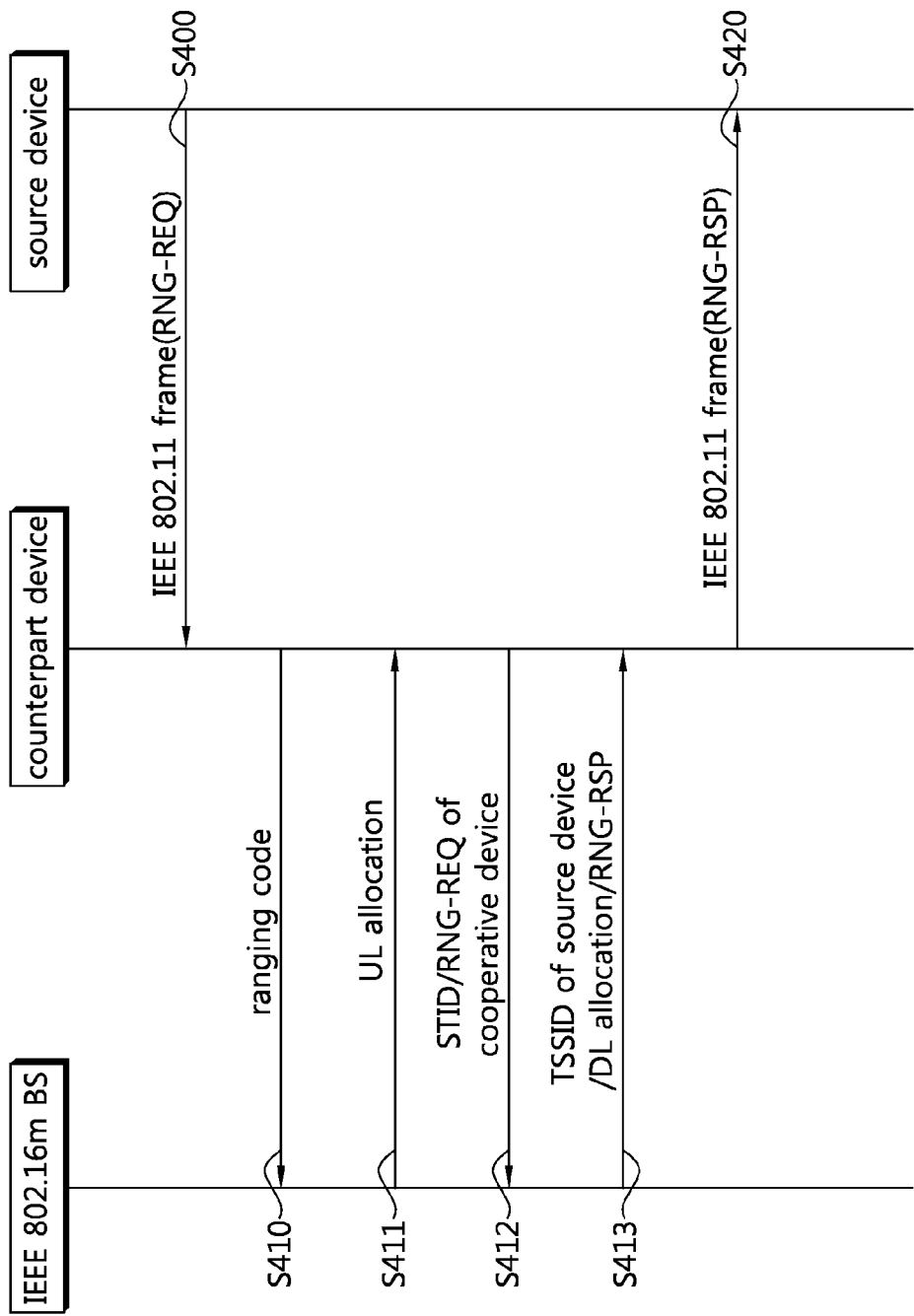
FIG. 10 shows another embodiment of the proposed network entry method.

FIG. 10 shows another embodiment of the proposed network entry method.

In step S400, the source device transmits a RNG-REQ message to the cooperative device. In this case, the RNG-REQ message may be encapsulated in a frame body field of an IEEE 802.11 frame and transmitted. Since the cooperative device has already operated as a cooperative device of client cooperation, it may implicitly recognize the received message as a RNG-REQ message.

In step S410, the cooperative device transmits a ranging code to the BS. In step S411, the BS allocates UL resource according to a general ranging procedure. In step S412, the cooperative device transmits the RNG-REQ message to the BS through the allocated UL resource. Here, in order to inform the BS about the presence of the cooperative device transmitting the RNG-REQ message received from the source device, the cooperative device may transmit an identifier thereof such as a station identifier (STID) together with the RNG-REQ message. Here, the identifier of the cooperative device may be included in a header, an extended header, or the RNG-REQ message, and transmitted. The BS may recognize the presence of the cooperative device assisting the source device which has transmitted the RNG-REQ message, through the identifier of the cooperative device.

In step S413, the BS transmits a RNG-RSP message as a response to the RNG-REQ message. The BS may transmit DL resource allocation information using a CDMA assignment A-MAP IE, or the like, and the RNG-RSP message to the cooperative device according to a general ranging procedure. Here, the DL assignment information may be masked with a random access identifier (RAID) or the STID of the cooperative device. Also, the BS may include a new identifier used for client cooperation or an identifier assigned to the source device in a header, an extended header, or the RNG-RSP message, and transmit the same.

In step S420, the cooperative device transmits the RNG-RSP message to the source device. Here, the RNG-RSP message may be encapsulated in a frame body field of an IEEE 802.11 frame and transmitted.

Figure 11:
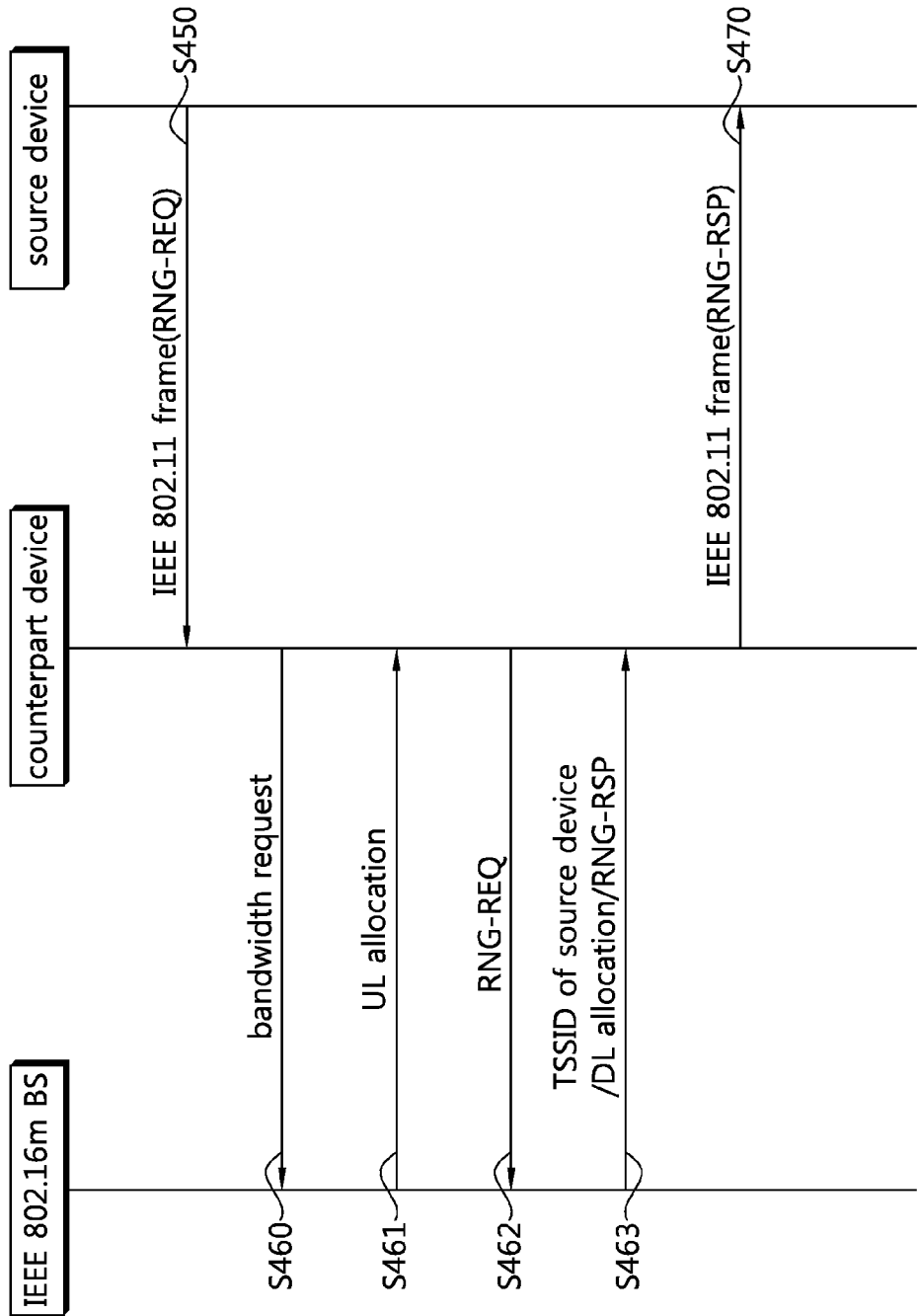
FIG. 11 shows another embodiment of the proposed network entry method.

FIG. 11 shows another embodiment of the proposed network entry method.

In step S450, the source device transmits a RNG-REQ message to the cooperative device. In this case, the RNG-REQ message may be encapsulated in a frame body field of an IEEE 802.11 frame and transmitted. Since the cooperative device has already operated as a cooperative device of client cooperation, it may implicitly recognize the received message as the RNG-REQ message.

In step S460, the cooperative device transmits a bandwidth request (BR) including its identifier to the BS. Since network entry of the source device and the BS has not been completed and the source device has not obtained an appropriate identifier yet, the identifier of the cooperative device may be used.

In step S461, the BS allocates UL resource according to a general bandwidth request procedure. In this case, the BS does not know from which device the bandwidth request has been received actually, so a scheduler of the BS may first assume that the cooperative device has requested the UL resource, and perform scheduling. For example, due to the corresponding bandwidth request and approval, a bandwidth request from the cooperative device may be pushed back on the priority list, since then. In order to prevent this, a BR preamble code set, a quick access message, or an indicator of a BR header aiming at indicating that it is to transmit data of a different device (e.g., the source device) may be newly defined.

In step S462, the cooperative device transmits a RNG-REQ message to the BS through the allocated UL resource. The BS may decode the RNG-REQ message to determine from which device the corresponding RNG-REQ message has been transmitted.

In step S463, the BS transmits a RNG-RSP message to the cooperative device as a response to the RNG-REQ message. The BS may transmit DL resource allocation information and the RNG-RSP message using an identifier of the cooperative device to the cooperative device according to a general bandwidth request procedure. In this case, the BS may include a new identifier used for client cooperation or an identifier assigned to the source device in a header, an extended header, or the ranging response message and transmit the same.

In step S470, the cooperative device transmits the RNG-RSP message to the source device. In this case, the RNG-RSP message may be encapsulated in a frame body field of an IEEE 802.11 frame, and transmitted.

In a manner similar to that described above, the source device may negotiate basic capability with the IEEE 802.16m. Namely, the source device encapsulates a SBC-REQ message in a frame body field of an IEEE 802.11 frame and transmits the same to a counterpart device, and the counterpart device transmits the SBC-REQ message to the BS on the basis of a general bandwidth request procedure. In response to DL resource allocation information using DL assignment A-MAP, or the like, and the SBC-REQ message, the BS transmits a SBC-RSP message to the counterpart device. The counterpart device encapsulates the received SBC-RSP message in a frame body field of an IEEE 802.11 frame and transmits the same to the source device.

The other remaining network entry procedures, than the ranging and the basic capability negotiation, may be performed in a similar manner, except for exchanged messages.

For example, a registration procedure may be performed in a manner similar to that of the basic capability negotiation procedure as described above. However, messages exchanged between and among the source device, the cooperative device, and the BS are a REG-REQ message and a REG-RSP message. Here, the BS may include a new identifier used for client cooperation or an identifier assigned to the source device in a header or an extended header and transmit the same. A privacy key management procedure may also be performed in a manner similar to that of the basic capability negotiation procedure. However, messages exchanged between or among the source device, the cooperative device, and the BS are privacy key management-related messages. A dynamic service flow procedure may be performed in a manner similar to that of the basic capability negotiation procedure. However, messages exchanged between or among the source device, the cooperative device, and the BS are dynamic service flow-related messages.

Hereinafter, a method for determining whether a counterpart device is operable as a cooperative device will be described. Whether a counterpart device is operable as a cooperative device may be determined by the counterpart device itself or by a BS.

Figure 12:
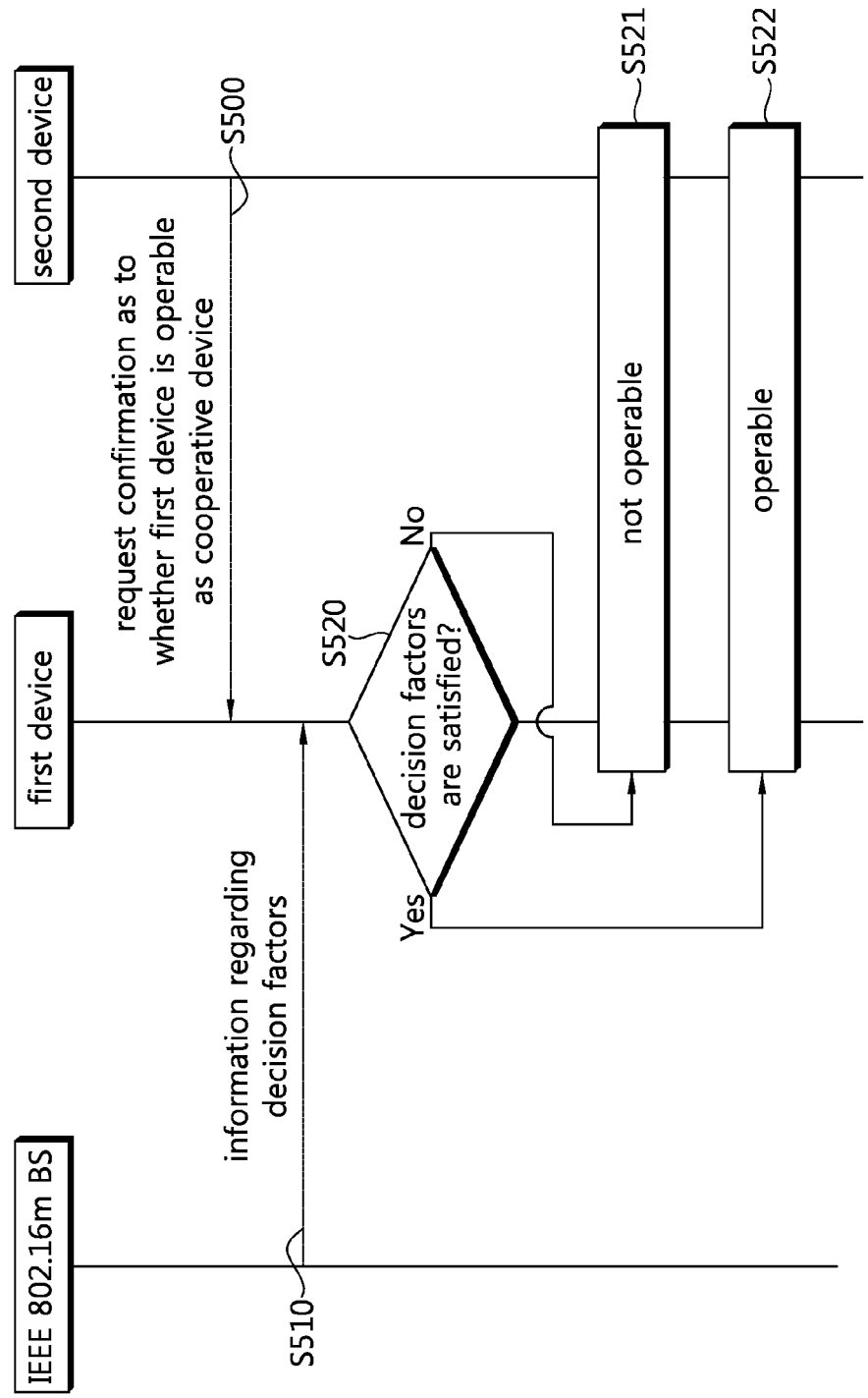
FIG. 12 shows an embodiment of the proposed method for transmitting information for client operation.

FIG. 12 shows an embodiment of the proposed method for transmitting information for client operation. FIG. 12 shows a case in which a counterpart device determines by itself whether it is operable as a cooperative device.

In step S520, a first device (candidate eligible to become a cooperative device) may determine whether it is operable as a cooperative device in consideration of various decision factors such as a movement speed thereof, a location thereof, the presence and absence and a number of devices eligible to become a cooperative device therearound, power consumption thereof, a channel state with the BS, and the like. In this case, the decision factors based on which whether the first device is operable as a cooperative device is determined may be obtained from the BS in step S510. Also, the determining whether the first device is operable as a cooperative device may be triggered by a second device (a candidate eligible to become a source device) in step S500. Namely, step S500 and step S510 may be optional.

When the first device determines that it satisfies the decision factors according to the determination result, the first device informs the second device that it is operable as a cooperative device of client cooperation in step S522. When the first device determines that it does not satisfy the decision factors, the first device informs the second device that it is not operable as a cooperative device of client cooperation in step S521. Whether the first device is operable as a cooperative device of client cooperation may be simultaneously broadcast to a plurality of devices or may be transmitted to a specific device in a unicast manner.

Figure 13:
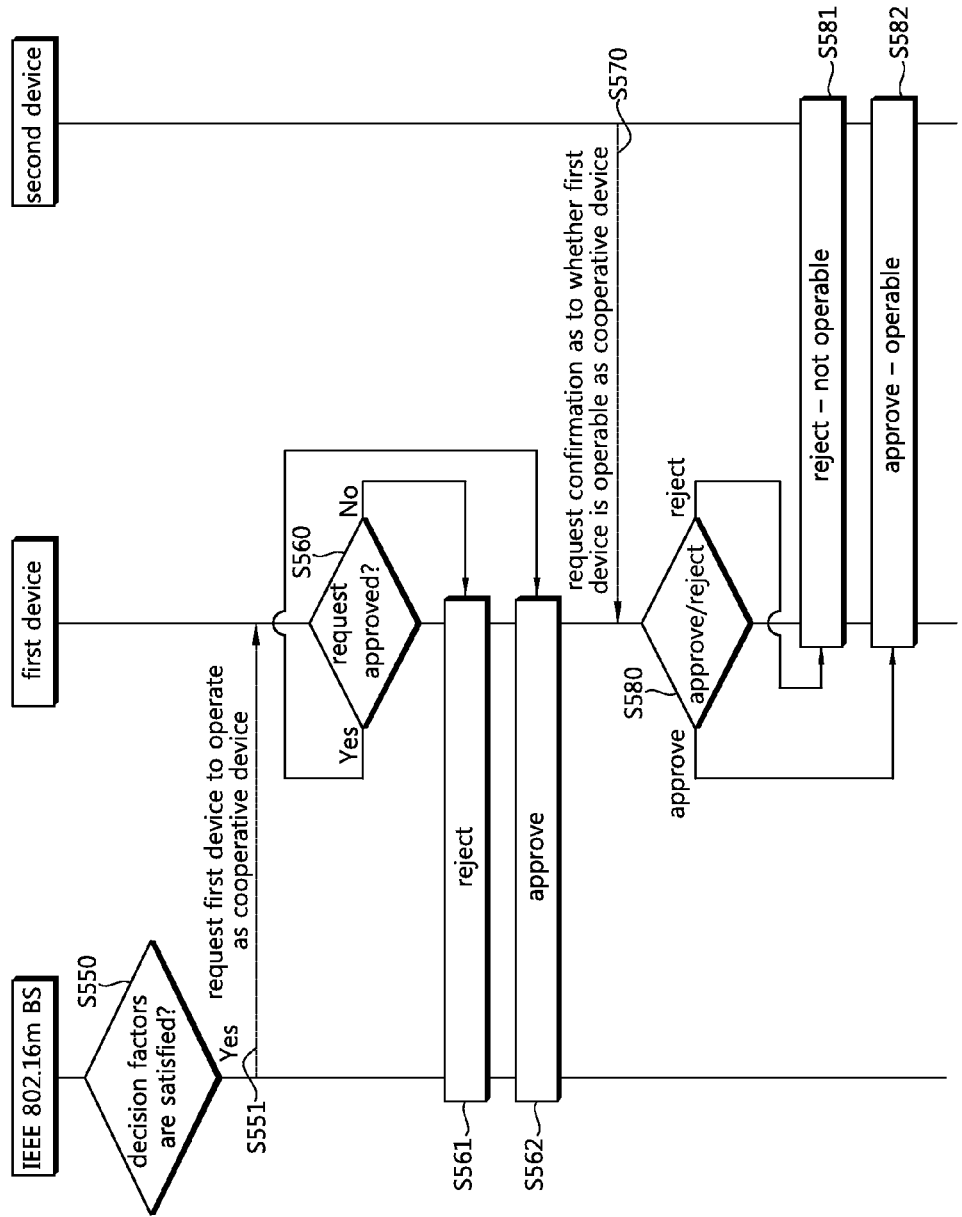
FIG. 13 shows another embodiment of the proposed method for transmitting information for client cooperation.

FIG. 13 shows another embodiment of the proposed method for transmitting information for client cooperation. FIG. 13 shows a case in which whether a counterpart device is operable as a cooperative device is determined through triggering by a BS.

When various decision factors such as the movement speed thereof, the location thereof, the presence and absence and a number of of devices eligible to become a cooperative device therearound, the power consumption thereof, the channel state with to the BS, and the like, are satisfied in step S550, the BS may request the first device to operate as a cooperative device in step S551.

In step S560, the first device determines whether to approve the request for operating as a cooperative device received from the BS. Only when the first device approves the request for operating as a cooperative device, the first device may operate as a cooperative device. If the first device rejects the request for operating as a cooperative device of client cooperation, the first device informs the BS accordingly in step S561. When the first device approves the request for operating as a cooperative device of client cooperation, the first device informs the BS accordingly in step S562. Meanwhile, after the approval of the cooperative device operation request, if radio frequency (RF) power of the IEEE 802.11 is turned off, the first device may turn on the RF power of IEEE 802.11 and perform a general operation performed in an IEEE 802.11 system. Such a general operation may be performed constantly or periodically. Also, as a state of the first device is changed, the BS may release the eligibility of first device as a cooperative device.

In step S570, the second device may request the first device to confirm whether the first device is operable as a cooperative device of client cooperation. In step S580, the first device may make a determination on the request from the second device as to whether to approve or reject the cooperation device operation request received from the BS. If the first device rejects the request for operating as a cooperative device, the first device cannot operate as a cooperative device, so it may inform the second device that the first device is not operable as a cooperative device in step S581. If the first device approves the request for operating as a cooperative device, since the first device is operable as a cooperative device, the first device may inform the second device that it is operable as a cooperative device in step S582. Also, in a case in which the first device is eligible as a cooperative device by satisfying the decision factors but it cannot operate as a cooperative device for various reasons, for example, it cannot help the source device any longer, and the like, the first device may inform the second device that it is not operable as a cooperative device in step S581.

Hereinafter, a method in which the source device obtains information for performing client cooperation from a cooperative device will be described.

First, information for performing client cooperation transmitted by the first device which has determined as to whether to operate as a cooperative device in client cooperation with the BS will be described.

The information for performing client cooperation transmitted by the first device may include information regarding whether the first device is a multi-RAT device.

The information for performing client cooperation may include a type of a system to which each device is connected. For example, the information for performing client cooperation may include information regarding whether each device is connected to IEEE 802.16m, whether each device is connected to 3GPP LTE, and the like. In a case in which to which system each device is connected is recognizable implicitly, the information may be omitted. If the first device is connected to two or more types of systems, the information for performing client cooperation may be established for each system.

The information for performing client cooperation may also include whether the first device is operable as a cooperative device in client cooperation. Also, the information for performing client cooperation may include whether the first device supports multi-RAT client cooperation. Whether the first device is operable as a cooperative device may be determined by the first device itself or through triggering by the BS as described above.

The information for performing client cooperation may include network service provider (NSP)-related information. The NSP-related information may include an NSP ID and a name list.

The information for performing client cooperation may include system information of the BS to which the first device is connected. The system information of the BS may be system information transmitted through an SFH or a broadcast channel. The system information of the BS may be limited to system information the second device should necessarily know to communicate with the BS. For example, the system information of the BS included in the information for performing client cooperation may include a BS ID (base station identifier), cell bar information, a MAC version, network configuration information, and the like. In a case in which a bit value forming the cell bar information is Obl, network entry or reentry to a corresponding cell may not be permitted. The network configuration information indicates a configuration of an ABS network such as an AAI (advanced air network) configuration, a Wirleless-MAN-OFDMA network configuration, or the like.

After the determination of whether the first device is operable as a cooperative device in client cooperation, the first device and the second device may exchange information for performing client cooperation. The first device may transmit information for performing client cooperation as described hereinafter to the second device simultaneously in a single frame during a procedure for authentication or association with the second device or after the association with the second device is completed. In this case, the single frame in which the client cooperation performing information is transmitted may be any one among management frames such as a beacon frame, a probe response frame, an authentication response frame, an association response frame, and the like, and a data frame. Alternatively, during the procedure for authentication or association with the second device or after the association with the second device is completed, the first device may transmit information for performing client cooperation as described hereinafter to the second device through a plurality of frames. For example, information as to whether the first device is a multi-RAT device may be transmitted in a beacon frame to the second device, and other information may be transmitted to the second device through an authentication response message. Also, in a case in which the first device is not a multi-RAT device or in a case in which the first device is not operable as a cooperative device of client cooperation, the other remaining information may not be transmitted to the second device.

Also, among the information for performing client cooperation, the information regarding whether the first device is a multi-RAT device or whether it is operable as a cooperative device may be provided through a service set identifier (SSID) transmitted through a beacon frame or a probe response frame. Namely, a candidate device that may become a cooperative device may transmit an SSID set to a defined value in advance through a beacon frame or a probe response frame. Upon receiving the beacon frame or the probe response frame including the previously defined SSID from the first device, the second device may recognize that the first device is operable as a cooperative device of client cooperation. The SSID may be defined according to a combination of radio access technologies (RATs). For example, when IEEE 802.16m and IEEE 802.11 configure a multi-RAT, SSID may be 0x12345. In a case in which IEEE 802.11 configures a multi-RAT, SSID may be 0x6789A.

Upon receiving the information for performing client cooperation, the second device determines whether performing of multi-RAT client cooperation with the first device is proper on the basis of the information for performing client cooperation. For example, when the first device is not a multi-RAT device, the second device may determine that performing multi-RAT client cooperation with the first device may not be proper. Also, in a case in which the first device is not operable as a cooperative device with respect to a system to which the second device intends to be connected, in a case in which the an NSP of the second device does not exist in received NSP information, in a case in which a value of cell bar information is 0b1, or in a case in which a received MAC version does not support the second device, the second device may determine that performing multi-RAT client cooperation with the first device is not proper.

In the case in which the second device determines that performing multi-RAT client cooperation with the first device is not proper, the second device may attempt to access a corresponding BS according to a charging method, a service flow forming method, a data conversion method, and the like. For example, in a case in which an NSP of the second device does not exist in received NSP information with respect to a system to which the second device intends to be connected, if a service that may be charged to the corresponding device is provided although a network of a different operator who has not joined is used, the second device may attempt to access the corresponding BS. Alternatively, in a case in which a MAC version received with respect to the system to which the second device intends to be connected does not support the second device, if the first device is able to process transmitted or received data and transmit the same to an actual receiver, the second device may attempt to access the corresponding BS.

The second device determines whether performing client cooperation with the first device is proper. When the second device determines that performing client cooperation with the first device is not proper, the second device may seek a different device. When the second device determines that performing client cooperation with the first device is proper, the second device may start network entry to the BS.

Figure 14:
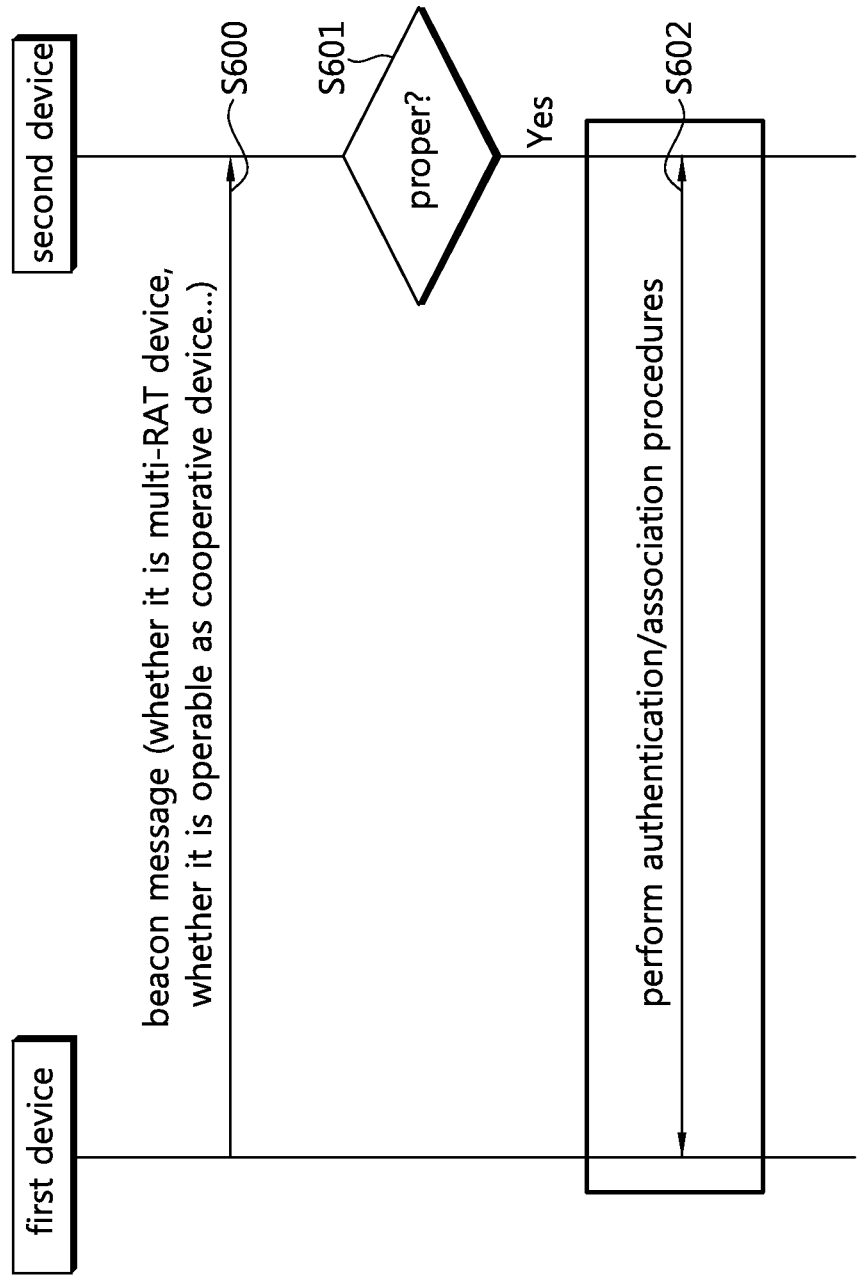
FIG. 14 shows an embodiment of the proposed method for transmitting information for client cooperation.

FIG. 14 shows an embodiment of the proposed method for transmitting information for client cooperation.

In step S600, the first device transmits a beacon frame to the second device. In this case, the beacon frame includes information for performing client cooperation between the first device and the second device. In step S601, the second device determines whether performing client cooperation with the first device is proper on the basis of the received information for performing client cooperation. When the second device determines that performing client cooperation with the first device is proper, in step S602, the first device and the second device perform authentication and association procedures, and the second device attempts network entry to the BS.

Figure 15:
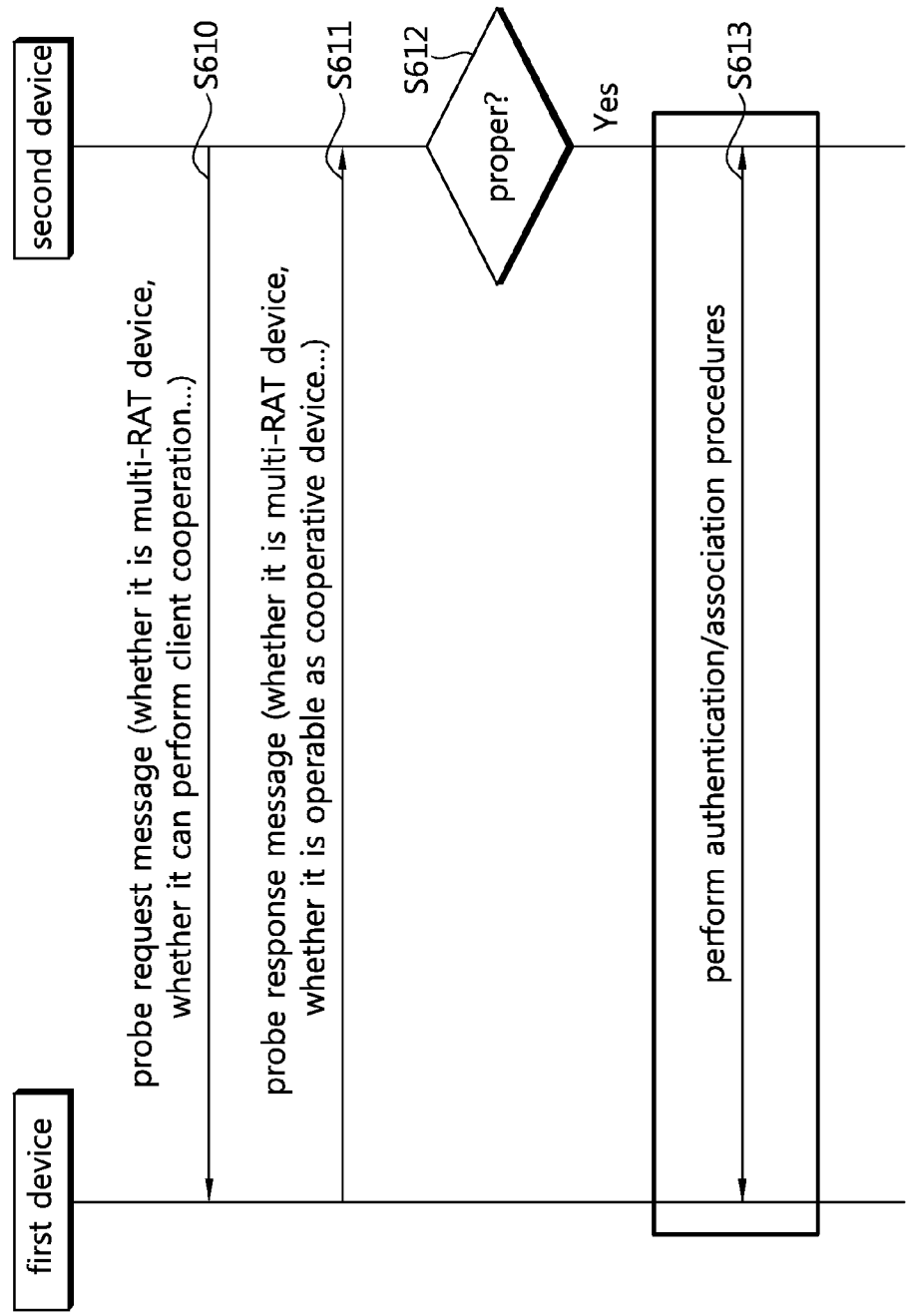
FIG. 15 shows another embodiment of the proposed method for transmitting information for client cooperation.

FIG. 15 shows another embodiment of the proposed method for transmitting information for client cooperation.

In step S610, the second device transmits a probe request frame to the first device. The second device requests the first device to perform client cooperation through a probe request frame. In step S611, the first device transmits a probe response frame to the second device. The probe response frame includes information for performing client cooperation between the first device and the second device. In step S612, the second device determines whether performing client cooperation with the first device is proper on the basis of the received information for performing client cooperation. When the second device determines that performing client cooperation with the first device is proper, in step S613, the first device and the second device perform authentication and authentication procedures, and the second device attempts network entry to the BS.

Figure 16:
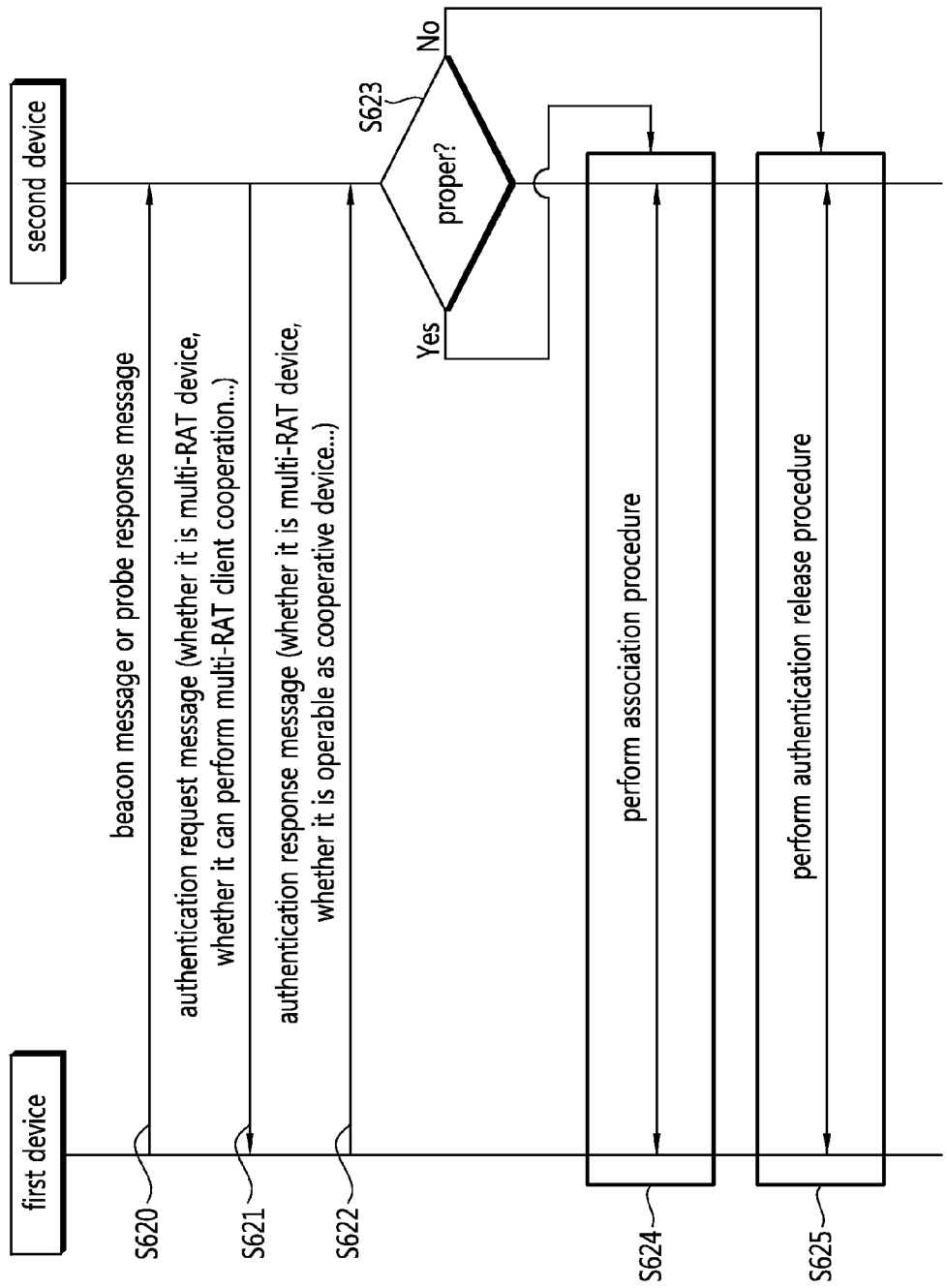
FIG. 16 shows another embodiment of the proposed method for transmitting information for client cooperation.

FIG. 16 shows another embodiment of the proposed method for transmitting information for client cooperation.

In step S620, the first device transmits a beacon frame or a probe response frame to the second device. In step S621, the second device transmits an authentication request frame to the first device. The second device requests the first device to perform client cooperation through the authentication request frame. The authentication request frame may include information regarding a system to which the second device intends to be connected. In step S622, the first device transmits an authentication response frame to the second device. The authentication response frame includes information for performing client cooperation between the first device and the second device. In step S623, the second device determines whether performing client cooperation with the first device is proper on the basis of the received information for performing client cooperation. When the second device determines that performing client cooperation with the first device is proper, in step S624, the first device and the second device perform an association procedure and the second device attempts network entry to the BS. When the second device determines that performing client cooperation with the first device is not proper, in step S625, the first device and the second device perform an authentication release procedure.

Figure 17:
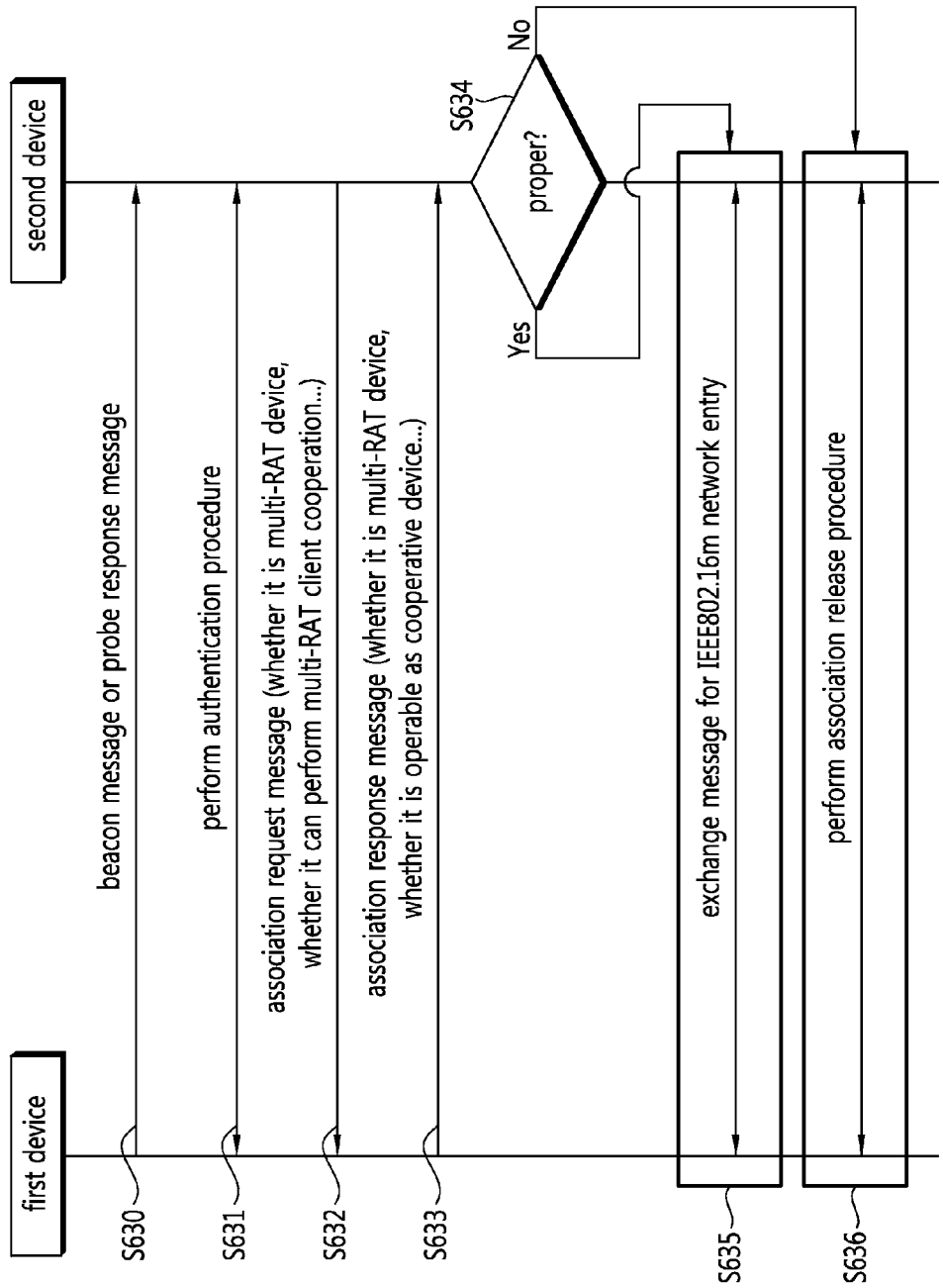
FIG. 17 shows another embodiment of the proposed method for transmitting information for client cooperation.

FIG. 17 shows another embodiment of the proposed method for transmitting information for client cooperation.

In step S630, the first device transmits a beacon frame or a probe response frame to the second device. In step S631, the first device and the second device perform an authentication procedure. In step S632, the second device transmits an association request frame to the first device. The second device requests the first device to perform client cooperation through the association request frame. The association request frame may include information regarding a system to which the second device intends to be connected. In step S633, the first device transmits an association response frame to the second device. The association response frame includes information for performing client cooperation between the first device and the second device. In step S634, the second device determines whether performing client cooperation with the first device is proper on the basis of the received information for performing client cooperation. When the second device determines that performing client cooperation with the first device is proper, in step S635, the first device and the second device exchange messages for IEEE 802.16m network entry to attempt network entry to the BS. When the second device determines that performing client cooperation with the first device is not proper, in step S636, the first device and the second device perform an association release procedure.

Figure 18:
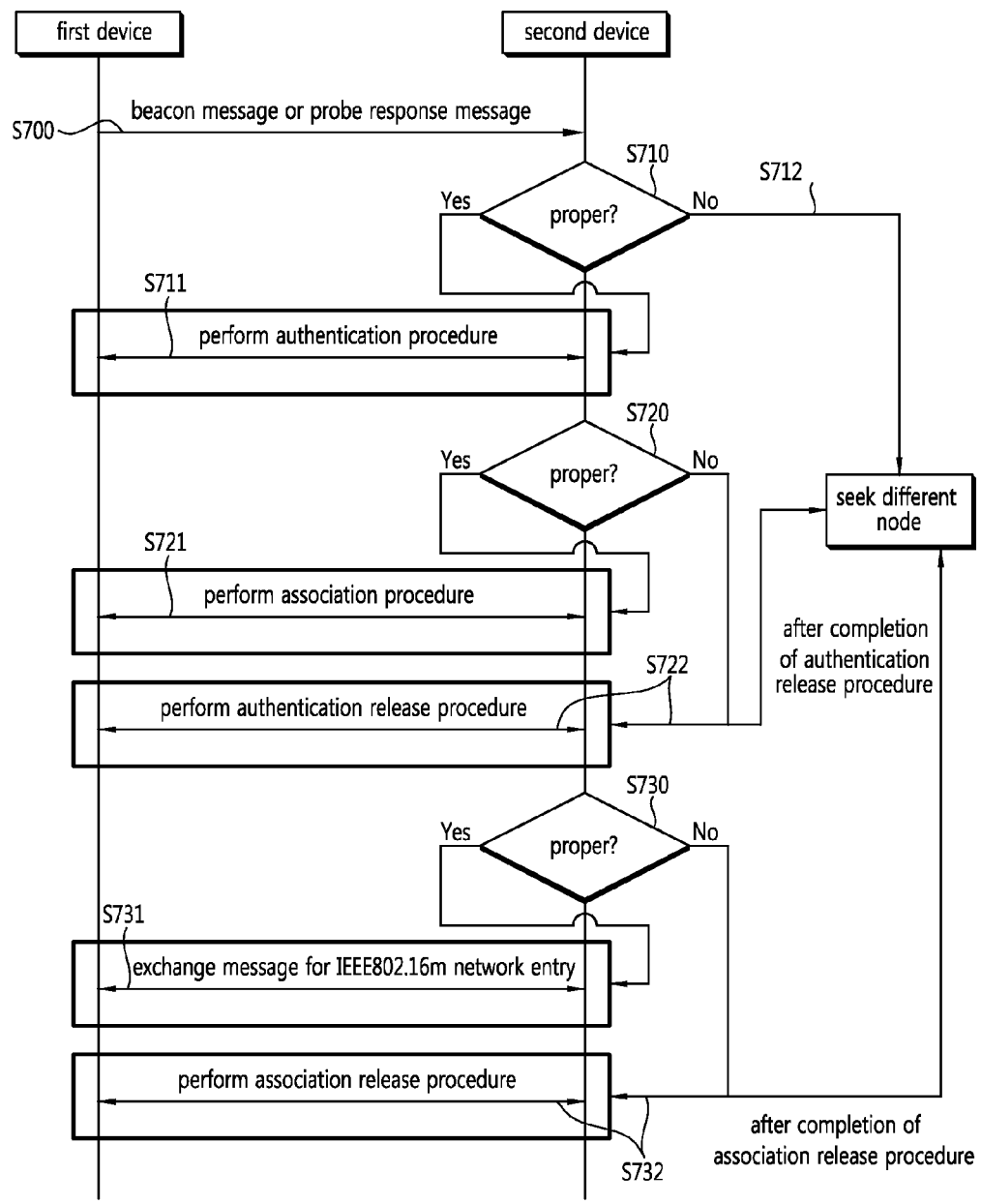
FIG. 18 shows another embodiment of the proposed method for transmitting information for client cooperation.

FIG. 18 shows another embodiment of the proposed method for transmitting information for client cooperation.

FIG. 18 shows a case in which information for performing client cooperation is transmitted distributedly through different frames, rather than being transmitted through a single frame simultaneously. In step S700, the first device transmits a beacon frame or a probe response frame to the second device. The beacon frame or the probe response frame may include a portion of the information for performing client cooperation. In step S710, the second device determines whether performing client cooperation with the first device is proper on the basis of a portion of the information for performing client cooperation. When the second device determines that performing client cooperation with the first device is not proper, the second device seeks a different node (or device). When the second device determines that performing client cooperation with the first device is proper, in step S711, the first device and the second device perform an authentication procedure.

In the authentication procedure, another portion of the information for performing client cooperation may be transmitted. In step S720, the second device determines whether performing client cooperation with the first device is proper on the basis of still another portion of the information for performing client cooperation. When the second device determines that performing client cooperation with the first device is proper, in step S721, the first device and the second device perform an association procedure. When the second device determines that performing client cooperation with the first device is not proper, in step S722, the first device and the second device perform an authentication release procedure, and after the completion of the authentication release procedure, the second device seeks a different node.

In an association procedure, still another portion of the information for performing client cooperation may be transmitted. In step S730, the second device determines whether performing client cooperation with the first device is proper on the basis of the still another portion of the information for performing client cooperation. When the second device determines that performing client cooperation with the first device is proper, in step S731, the second device exchanges messages for IEEE 802.16m network entry with the first device, and attempts network entry to the BS. When the second device determines that performing client cooperation with the first device is not proper, in step S732, the first device and the second device perform an association release procedure, and after the completion of the association release procedure, the second device seeks a different node.

Alternatively, the information for performing client cooperation may be transmitted through a data frame after the completion of the association procedure between the first device and the second device.

As described above, by exchanging information for performing client cooperation between the first device and the second device, the approval procedure for client cooperation may be completed. After all the procedures are completed, the first device may operate as a cooperative device of client cooperation and the second device may operate as a source device of client cooperation.

Figure 19:
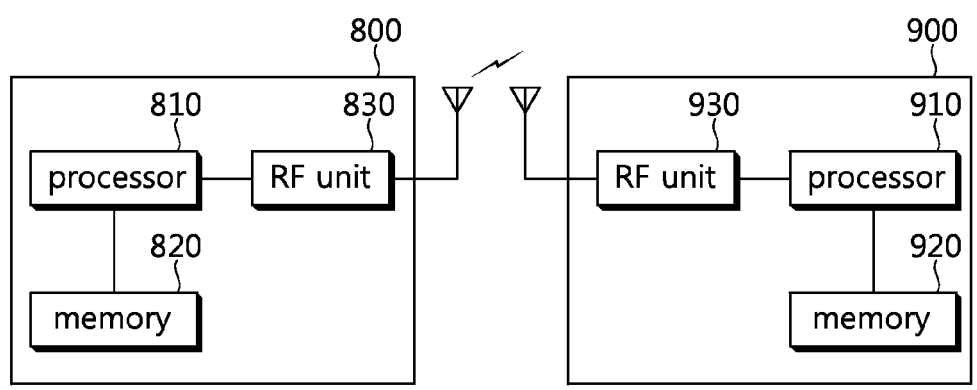
FIG. 19 is a block diagram showing wireless communication system to implement an embodiment of the present invention.

FIG. 19 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for entering, by a first device, a network for client cooperation in a wireless communication system, the method comprising:
   determining whether the first device is operable as a cooperative device of a client cooperation for a second device,
     wherein the first device is determined to be operable as the cooperative device according to one or more decision factors,
     wherein the one or more decision factors are a movement speed of the first device, a location of the first device, a power consumption of the first device, and a channel state with the base station by the first device,
   if it is determined that the first device is operable as the cooperative device of the client cooperation, then transmitting information related with the client cooperation to a second device,
   receiving a ranging request message from the second device through a frame of a first system;
   transmitting the received ranging request message to the base station of a second system;
   receiving a ranging response message as a response to the ranging request message from the base station of the second system; and
   transmitting the ranging response message to the second device through the frame of the first system.

2. The method of claim 1, wherein the first system is an institute of electrical and electronics engineers (IEEE) 802.11 system.

3. The method of claim 1, wherein the ranging request message is transmitted to the base station of the second system through a ranging procedure.

4. The method of claim 3, wherein the transmitting of the received ranging request message to the base station of the second system comprises: transmitting a ranging code to the base station of the second system; receiving allocated uplink resources from the base station of the second system, and transmitting the ranging request message to the base station of the second system through the allocated uplink resource.

5. The method of claim 4, further comprising: transmitting an identifier of the first device to the base station of the second system.

6. The method of claim 5, wherein the identifier of the first device is transmitted through a header or an extended header, or is transmitted by being included in the ranging request message.

7. The method of claim 1, wherein the ranging request message is transmitted to the base station of the second system through a bandwidth request procedure.

8. The method of claim 7, wherein the transmitting of the received ranging request message to the base station of the second system comprises: transmitting a bandwidth request including an identifier of the first device to the base station of the second system; receiving allocated uplink resources from the base station of the second system; and transmitting the ranging request message to the base station of the second system through the allocated uplink resource.

9. The method of claim 1, further comprising: receiving an identifier of the second device or a new identifier for client cooperation from the base station of the second system.

10. The method of claim 9, wherein the identifier of the second device or the new identifier for client cooperation is received through a header or an extended header, or is received by being included in the ranging response message.

11. A device in a wireless communication system, the device comprising:
   a radio frequency (RF) unit configured to transmit or receive a radio signal; and
   a processor connected to the RF unit, and configured to:
   determine whether a first device is operable as a cooperative device of a client cooperation for a second device,
     wherein the first device is determined to be operable as the cooperative device according to one or more decision factors,
     wherein the one or more decision factors are a movement speed of the first device, a location of the first device, a power consumption of the first device, and a channel state with the base station by the first device, if it is determined that the first device is operable as the cooperative device of the client cooperation, then transmit information related with the client cooperation to a second device, receive a ranging request message from the second device through a frame of a first system;

transmit the received ranging request message to the base station of a second system;

receive a ranging response message as a response to the ranging request message from the base station of the second system; and transmit the ranging response message to the second device through the frame of the first system.

* * * * *